United States Patent Office 3,388,137
Patented June 11, 1968

3,388,137
HALO-SUBSTITUTED CYCLOALKENYLACYL DERIVATIVES OF ARYL POLYCARBOXYLIC ACIDS OR ANHYDRIDES THEREOF
Louis Schmerling, Skokie, Ill., assignor to Universal Oil Products Company, Des Plaines, Ill., a corporation of Delaware
No Drawing. Filed Oct. 1, 1964, Ser. No. 400,927
16 Claims. (Cl. 260—346.3)

ABSTRACT OF THE DISCLOSURE

Halo-substituted cycloalkenylacyl derivatives of aryl polycarboxylic acid or corresponding anhydride, exemplified by 4-[(1,4,5,6,7,7-hexachloro-5-norbornen-2-yl)acetyl]phthalic acid. The compounds are useful as flame retardants for plastics and textiles.

This invention relates to novel compositions of matter and to a method for the preparation thereof. More particularly, the invention is concerned with novel intermediates for the preparation of flame retardant articles of manufacture.

The increased use of synthetic materials, including resins, plastics and textiles, as well as naturally occurring textiles such as wool, cotton, etc., has also brought forth the requirement that these articles possess desirable characteristics. Among the most desirable characteristics that some of these articles must possess is that of flame resistancy or flame retardancy, especially when the articles are used in places wherein they are normally subject to excessive heat or the possibility of contact with an open flame. In this respect the article must contain, either as an element thereof or by impregnation therewith, some compound which will impart the aforesaid flame resistancy or retardancy to the specific article. In this respect it has has now been discovered that novel compositions of matter possessing the desirable characteristic of flame retardancy may be prepared according to the process of the present invention, hereinafter set forth in greater detail.

It is therefore an object of this invention to prepare novel compositions of matter which possess flame resistant and flame retardant properties.

A further object of this invention is to prepare halo-substituted cycloalkenylacyl derivatives of aryl polycarboxylic acids and anhydrides thereof.

In a broad aspect the invention is concerned with a compound selected from the group consisting of halo-substituted cycloalkenylacyl derivatives of aryl polycarboxylic acids and anhydrides thereof.

Another broad aspect of the invention is concerned with a process for the preparation of a compound selected from the group consisting of halo-substituted cycloalkenylacyl derivatives of aryl polycarboxylic acids and anhydrides thereof which comprises reacting a halo-substituted conjugated diene with an unsaturated acid halide characterized by the presence of at least one hydrogen atom on each of the doubly-bonded carbon atoms at a temperature in the range of from about 100° to about 250° C., thereafter condensing the resultant halo-substituted cycloalkenylacyl halide with a compound selected from the group consisting of aryl polycarboxylic acids and anhydrides thereof in the presence of a metal halide catalyst at condensation conditions, and recovering the resultant product.

A specific embodiment of the invention is found in a compound selected from the group consisting of chloro-substituted cycloalkenylacyl derivatives of aryl polycarboxylic acids and anhydrides thereof.

Another specific embodiment of the invention resides in 4-[1,4,5,6,7,7 - hexachloro - 5 - norbornen-2-yl)acetyl]-phthalic acid.

Yet another specific embodiment of the invention is found in a process which comprises reacting hexachlorocyclopentadiene with vinylacetyl chloride at a temperature in the range of from about 100° to about 250° C., thereafter condensing the resultant 1,4,5,6,7,7-hexachloro-5-norbornen-2-ylacetyl chloride with phthalic acid in the presence of zinc chloride at a temperature in the range of from about 100° to about 200° C., and recovering the resultant 4-[(1,4,5,6,7,7 - hexachloro-5-norbornen-2-yl)-acetyl]phthalic acid.

Other objects and embodiments will be found in the following further detailed description of this invention.

As hereinbefore set forth, it has now been discovered that novel compositions of matter comprising halo-substituted cycloalkenylacyl derivatives of aryl polycarboxylic cycloalkenylacyl derivatives of aryl polycarboxylic acids and anhydrides thereof may be prepared by reacting a halo-substituted conjugated alkadiene or cycloalkadiene with an unsaturated acid halide containing certain characteristics, hereinafter set forth in greater detail, and thereafter condensing the resultant compound with an aryl polycarboxylic acid or anhydride thereof in the presence of certain catalysts to prepare the desired compound. Due to the specific configuration of the resultant novel compositions of matter, said compounds, in addition to possessing the desirable properties or characteristics of imparting flame resistant properties to resins, plastics, textiles, etc., will also possess pestiologically active properties which will make them useful compounds for insecticides, miticides, fungicides, etc.

The first step in the process of the present invention, which is the preparation of a halo-substituted cycloalkenylacyl halide, is effected by reacting a halo-substituted conjugated alkadiene or cycloalkadiene with an unsaturated acid halide, the latter compound being characterized by containing at least one hydrogen atom on each of the doubly-bonded carbon atoms. A representative example of this reaction is illustrated by the following equation in which hexachlorocyclopentadiene is reacted with vinylacetyl chloride to prepare 1,4,5,6,7,7-hexachloro-5-norbornen-2-ylacetyl chloride.

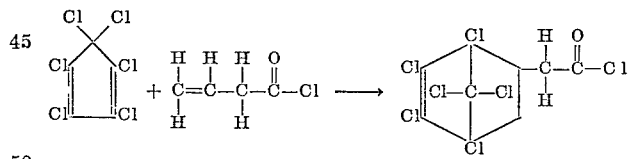

This reaction is effected at elevated temperatures ranging from about 100° to about 250° C. and preferably in a range of from about 125° to about 175° C. If so desired, the reaction may be effected in the presence of a substantially inert organic solvent or diluent such as aromatic hydrocarbons, including benzene, toluene, o-xylene, m-xylene, p-xylene, ethylbenzene, etc., or paraffinic hydrocarbons such as n-pentane, n-hexane, n-heptane, cyclopentane, methylcyclopentane, cyclohexane, etc.

Cycloalkadienic compounds which may be used in this invention and which contain halogen substituents, said compounds containing only carbon, hydrogen and halogen atoms, possess the generic formula:

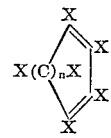

in which the X's are independently selected from the group consisting of hydrogen or halogen radicals having an atom weight of from 35 to 127 (i.e., chlorine, bromine or iodine), at least one of the X's being halogen, and $n$ is an integer of from 1 to 2. Representative compounds include 1-chlorocyclopentadiene,
1,2-dichlorocyclopentadiene,
1,2,3-trichlorocyclopentadiene,
1,2,3,4-tetrachlorocyclopentadiene,
1,2,3,4,5-pentachlorocyclopentadiene,
hexachlorocyclopentadiene,
1-bromocyclopentadiene,
1,2-dibromocyclopentadiene,
1,2,3-tribromocyclopentadiene,
1,2,3,4-tetrabromocyclopentadiene,
1,2,3,4,5-pentabromocyclopentadiene,
hexabromocyclopentadiene,
1-iodocyclopentadiene,
1,2-diiodocyclopentadiene,
1,2,3-triiodocyclopentadiene,
1,2,3,4-tetraiodocyclopentadiene,
1,2,3,4,5-pentaiodocyclopentadiene,
hexaiodocyclopentadiene, etc.

It is also contemplated within the scope of this invention that polyhalo-substituted conjugated cyclohexandienes such as 1,2-dichloro-1,3-cyclohexadiene,
1,2,3-trichloro-1,3-cyclohexadiene,
octachloro-1,3-cyclohexadiene, etc.,
1,2-dibromo-1,3-cyclohexadiene,
1,2,3-tribromo-1,3-cyclohexadiene,
octabromo-1,3-cyclohexadiene,
1,2-diiodo-1,3-cyclohexadiene,
1,2,3-triiodo-1,3-cyclohexadiene,
octaiodo-1,3-cyclohexadiene, etc., may also be used. In addition, it is also contemplated that polyhalocycloalkadienes which are used in preparing the cycloalkenylacyl halides of this process may contain more than one species of halo substituents such as, for example, 1 - chloro - 2 - bromocyclopentadiene, 1,2 - dichloro - 3 - bromocyclopentadiene, 1,2 - dichloro - 5,5 - dibromocyclopentadiene, etc.

It is also contemplated within the scope of this invention that other halo-substituted compounds may be condensed or reacted with the unsaturated acid halide which is characterized by containing at least one hydrogen atom on each of the doubly-bonded carbon atoms. For example, halogenated conjugated straight-chain diolefins containing only carbon, hydrogen and halogen atoms, such as, 1-chloro-1,3-butadiene,
1,3-dichloro-1,3-butadiene,
1-bromo-1,3-butadiene,
1,3-dibromo-1,3-butadiene,
1-iodo-1,3-butadiene,
1,1,3-trichloro-1,3-butadiene,
1,1,3-triiodo-1,3-butadiene,
1,1,2-trichloro-1,3-butadiene,
1,1,4-tribromo-1,3-butadiene,
1,1,4,4-tetrachloro-1,3-butadiene,
1,1,4,4-tetrabromo-1,3-butadiene,
1,1,4,4-tetraiodo-1,3-butadiene,
1,3-dichloro-2-methyl-1,3-butadiene,
1,4-dichloro-2-methyl-1,3-butadiene,
1,1,4,4-tetrachloro-2-methyl-1,3-butadiene,
1,1,4,4-tetrabromo-2-methyl-1,3-butadiene,
1,4-diiodo-2-iodomethyl-1,3-butadiene,
1,1-dichloro-3-bromo-1,3-butadiene,
1-chloro-3-bromo-1,3-butadiene,
1-iodo-3-chloro-1,3-butadiene,
2-bromo-3-chloro-1,3-butadiene,
1,4-dichloro-2-bromomethyl-1,3-butadiene,
1,4-dichloro-2-iodomethyl-1,3-butadiene, etc., may be used although not necessarily with equivalent results.

The unsaturated acid halides which are used in preparing the cycloalkenylacyl halides are characterized by containing at least one hydrogen atom on each of the doubly-bonded carbon atoms; they include monobasic acid halides such as acrylyl chloride, acrylyl bromide, vinylacetyl chloride, vinylacetyl bromide, crotonyl chloride, crotonyl bromide, propylideneacetyl chloride, propylideneacetyl bromide, ethylidenepropionyl chloride, ethylidenepropionyl bromide, allylacetyl chloride, allylacetyl bromide, etc.; unsaturated dibasic acid halides such as maleoyl monochloride, maleoyl dichloride, maleoyl monobromide, maleoyl dibromide, fumaryl monochloride, fumaryl dichloride, fumaryl monobromide, fumaryl dibromide, glutaconyl monochloride, glutaconyl dichloride, glutaconyl monobromide, glutaconyl dibromide, allylmalonyl monochloride, allylmalonyl dichloride, allylmalonyl monobromide, allylmalonyl dibromide, propenylmalonyl monochloride, propenylmalonyl dichloride, propenylmalonyl monobromide, propenylmalonyl dibromide, allylsuccinyl monochloride, allylsuccinyl dichloride, allylsuccinyl monobromide, allylsuccinyl dibromide, etc. It is to be understood that the aforementioned halo-substituted cycloalkadienes and unsaturated acid halides are only representatives of the class of compounds which may be used and that the present invention is not necessarily limited thereto.

In addition, it is further contemplated that conjugated straight-chain and cyclic diolefinic hydrocarbons containing only carbon and hydrogen atoms such as 1,3 - butadiene, 2 - methyl - 1,3 - butadiene, 1,3 - cyclopentadiene, etc. may be condensed with the unsaturated acid halides of the type hereinbefore set forth and the resulting product is then condensed with one of the halogenated dienes, particularly hexachlorocyclopentadiene, above described.

The compounds resulting from the reaction between the halo-substituted cycloalkadienic compound with an unsaturated acid halide which contains at least one hydrogen atom on each of the doubly-bonded carbon atoms are halo-substituted cycloalkenylacyl halides, a term which for purpose of this invention, as used in the present specification and appended claims, includes halo-substituted mono-, bi- and polycycloalkenylacyl halides. Such compounds will include 1,4-dichloro-5-norbornen-2-ylacetyl chloride,
1,4-dichloro-5-norbornen-2-ylacetyl bromide,
1,4,5,6,7,7-hexachloro-5-norbornen-2-ylacetyl chloride,
1,4,5,6,7,7-hexachloro-5-norbornen-2-ylacetyl bromide,
1,4,5,6,7,7-hexabromo-5-norbornen-2-ylacetyl chloride,
1,4,5,6,7,7-hexabromo-5-norbornen-2-ylacetyl bromide,
1,4-dichloro-5-norbornen-2-carbonyl chloride,
1,4-dichloro-5-norbornen-2-carbonyl bromide,
1,4,5,6,7,7-hexachloro-5-norbornen-2-carbonyl chloride,
1,4,5,6,7,7-hexachloro-5-norbornen-2-carbonyl bromide,
1,4,5,6,7,7-hexabromo-5-norbornen-2-carbonyl chloride,
1,4,5,6,7,7-hexabromo-5-norbornen-2-carbonyl bromide,
1,4-dichloro-3-methyl-5-norbornen-2-carbonyl chloride,
1,4-dichloro-3-methyl-5-norbornen-2-carbonyl bromide,
1,4,5,6,7,7-hexachloro-3-methyl-5-norbornen-2-carbonyl chloride,
1,4,5,6,7,7-hexachloro-3-methyl-5-norbornen-2-carbonyl bromide,
1,4,5,6,7,7-hexabromo-3-methyl-5-norbornen-2-carbonyl chloride,
1,4,5,6,7,7-hexabromo-3-methyl-5-norbornen-2-carbonyl bromide, etc.

The aforementioned halo-substituted cycloalkenylacyl halide is then condensed with an aryl polycarboxylic acid or anhydride thereof at an elevated temperature, usually in the range of from about 50° to about 200° C., in the presence of a metal halide catalyst of the Friedel-Crafts type. These catalysts include such compounds as aluminum chloride, zinc chloride, ferric chloride, zirconium chloride, etc. Examples of aryl polycarboxylic acids or anhydrides thereof which may be utilized include phthalic acid, phthalic anhydride, isophthalic acid, terephthalic acid, trimesic acid, trimellitic acid, trimellitic anhydride, hemimellitic acid, hemimellitic anhydride, prehnitic acid, prehnitic anhydride, mellophanic acid, mellophanic anhydride, pyromellitic acid, pyromellitic anhydride, benzenepentacarboxylic acid, benzenepentacarboxylic acid anhydride, 1,4-naphthalenedicarboxylic acid, 1,8-naphthalenedicarboxylic acid, phenylmaleic acid, phenylmaleic acid anhydride, phenylsuccinic acid, phenylsuccinic acid anhydride, phenylglutaric acid, phenylglutaric acid anhydride, etc.

An examle of the condensation reaction between the halo-substituted cycloalkenylacyl halide and the aryl polycarboxylic acid or anhydride thereof is illustrated by the following equation in which 1,4,5,6,7,7-hexachloro-5-norbornen-2-ylacetyl chloride is reacted with phthalic anhydride in the presence of zinc chloride at a temperature in the range of from about 100° to about 200° C. to form 4 - [(1,4,5,6,7,7 - hexachloro - 5 - norbornen-2-yl)acetyl] phthalic anhydride.

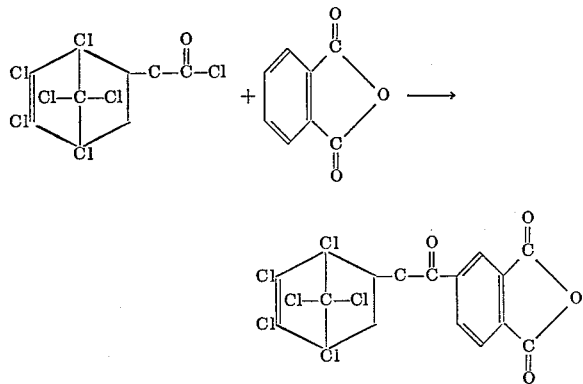

Th process of the present invention may be effected in any suitable manner and may comprise either a batch or continuous type operation. For example, when a batch type operation is used, a quantity of the halo-substituted diene and the unsaturated acid halide characterized by containing at least one hydrogen atom on each of the doubly-bonded carbon atoms is placed in a condensation apparatus provided with heating and refluxing means. In addition, if so desired, an organic solvent such as xylene is added and the resulting mixture is refluxed for a predetermined period of time ranging from about 1 to about 10 hours or more. At the end of this time the adduct comprising the halo-substituted cycloalkenylacyl halide is recovered by conventional means. This adduct is then placed in a second condensation flask or apparatus along with the aryl polycarboxylic acid or anhydride thereof and a catalytic amount of a metal halide compound such as zinc chloride. This mixture is then heated to the desired reaction temperature and maintained thereat for a predetermined period of time. At the end of this time the flask and contents thereof are allowed to cool to room temperature and the desired product comprising the halo-substituted cycloalkenylacyl derivative of the aryl polycarboxylic acid or anhydride thereof is separated from the unreacted starting materials and catalyst and recovered by conventional means.

It is also contemplated within the scope of this invention that the process described herein may be effected in a continuous manner of operation. When this type of operation is used, a quantity of the starting materials comprising, as hereinbefore set forth, the halo-substituted diene and an unsaturated acid halide are continuously charged to a reaction zone which is maintained at the proper operating conditions of temperature and pressure. In addition, if so desired, a substantially inert organic solvent is also charged to the reaction zone through a separate line or, if so desired, it may be admixed with one or both of the starting materials prior to entry into said reaction zone and the mixture charged thereto in a single stream. Upon completion of the desired residence time in the reaction zone the reactor effluent is continuously withdrawn, separated into the desired adduct and unreacted starting materials, the latter being recycled to form a portion of the feed stock while the former is continuously charged to a second reaction zone which is also maintained at the proper operating conditions of temperature and pressure. This second reaction zone contains the desired catalyst comprising a metal halide compound. In addition, the aryl polycarboxylic acid or anhydride thereof is also continuously charged to the second reaction zone through a separate stream or, if so desired, it may be admixed with the adduct and the resulting mixture charged thereto in a single stream. Upon completion of the desired residence time in the second reaction zone the reactor effluent is continuously withdrawn and the desired product is separated from unreacted starting materials and recovered.

Examples of halo-substituted cycloalkenylacyl derivatives of aryl polycarboxylic acids and anhydrides thereof which may be prepared according to the process of this invention and which constitute novel compositions of matter include 4-[(2,3,4,5-tetrachloro-3-cyclohexenyl)acetyl]phthalic acid,
4-[(1,4-dichloro-5-norbornen-2-yl)acetyl]phthalic anhydride,
4-[(1,4-dichloro-5-norbornen-2-yl)acetyl]phthalic acid,
5-[(1,4-dichloro-5-norbornen-2-yl)acetyl]isophthalic acid,
2-[(1,4-dichloro-5-norbornen-2-yl)acetyl]trimesic acid,
5-[(1,4-dichloro-5-norbornen-2-yl)acetyl]trimellitic acid,
4-[(1,4,5,6,7,7-hexachloro-5-norbornen-2-yl)acetyl] phthalic anhydride,
4-[(1,4,5,6,7,7-hexachloro-5-norbornen-2-yl)acetyl] phthalic acid,
5-[(1,4,5,6,7,7-hexachloro-5-norbornen-2-yl)acetyl]isophthalic acid,
2-[(1,4,5,6,7,7-hexachloro-5-norbornen-2-yl)acetyl] trimesic acid,
5-[(1,4,5,6,7,7-hexachloro-5-norbornen-2-yl)acetyl] trimellitic acid,
4-[(1,4-dibromo-5-norbornen-2-yl)acetyl]phthalic anhydride,
5-[(1,4-dibromo-5-norbornen-2-yl)acetyl]isophthalic acid,
5-[(1,4-dibromo-5-norbornen-2-yl)acetyl]trimellitic acid,
4-[(1,4,5,6,7,7-hexabromo-5-norbornen-2-yl)acetyl] phthalic acid,
2-[(1,4,5,6,7,7-hexabromo-5-norbornen-2-yl)acetyl] trimesic acid, etc.

The following examples are given to illustrate the process of the present invention which, however, are not intended to limit the generally broad scope of the present invention in strict accordance therewith.

Example I

In this experiment 135 grams (0.5 mole) of hexachlorocyclopentadiene and 51.5 grams (0.5 mole) of vinylacetyl chloride are dissolved in 25 cc. of xylene and the solution is placed in a condensation apparatus provided with heating and refluxing means. The solution is then heated under reflux, the temperature rising from about 122° to about 154° C. during a period of about six hours. The temperature is maintained at 154° C. for an additional period of about 1.5 hours, during which time some hydrogen chloride is evolved. At the end of this time the flask and contents thereof are allowed to cool to room temperature after which the reaction mixture is subjected to fractional distillation under reduced pressure. There is obtained a 56% yield of 1,4,5,6,7,7-hexachloro-5-norbornen-2-ylacetyl chloride which boils at 135°–136° C. at 1.0–1.1 mm. pressure. The crystals which form upon cooling have a melting point of 48°–50° C. Analysis of these products give the following results:

Calculated for $C_9H_5OCl_7$: Cl, 65.64. Found: Cl, 65.5.

To prepare the desired compound, 188 grams (0.5 mole) of the adduct prepared according to the above paragraph, 166 grams (1.0 mole) of phthalic acid and 50 grams of zinc chloride along with 50 cc. of xylene are placed in a flask equipped with a stirrer and condenser and is thereafter heated to a temperature of about 122° C. The mixture is allowed to reflux for a period of about 8 hours after which the flask and contents thereof are allowed to cool to room temperature. The reaction mixture is separated from the catalyst by filtration, subjected to purification processes and thereafter fractionally crystallized. The desired product comprising 4-[(1,4,5,6,7,7-hexachloro-5-norbornen-2-yl)acetyl]phthalic acid is separated and recovered.

Example II

In this example an adduct similar to that set forth in Example I above is prepared by condensing 135 grams (0.5 mole) of hexachlorocyclopentadiene with 52 grams (0.5 mole) of vinylacetyl chloride dissolved in 25 cc. of xylene, the mixture being heated to reflux and maintained at a temperature of about 154° C. for a total residence time of about 7.5 hours. At the end of this time the flask and contents thereof are allowed to cool to room temperature and the desired adduct comprising 1,4,5,6,7,7-hexachloro-5-norbornen-2-ylacetyl chloride is recovered from the reaction mixture by fractional distillation under reduced pressure.

A mixture of 188 grams (0.5 mole) of the adduct prepared according to the above paragraph, 74 grams (0.5 mole) of phthalic anhydride, 50 cc. of xylene and 100 grams of aluminum chloride is stirred in the flask mentioned in Example I at a temperature in the range of from 50° to 75° C. for a period of about 4 hours. At the end of this time the flask and contents thereof are allowed to cool to room temperature and the reaction mixture is separated from the catalyst. After conventional purification steps the reaction mixture is subjected to fractional crystallization and the desired product comprising 4-[(1,4,5,6,7,7-hexachloro-5-norbornen-2-yl)acetyl] phthalic anhydride is separated and recovered.

Example III

An adduct comprising 1,4,5,6,7,7-hexachloro-5-norbornen-2-ylacetyl chloride is prepared according to the method set forth in Example I above. Following the recovery of this adduct, a mixture comprising 188 grams (0.5 mole) of the adduct, 83 grams (0.5 mole) of isophthalic acid and 50 grams of zinc chloride and 50 cc. of xylene is refluxed for a total residence time of about 7.5 hours. At the end of this time the reaction mixture is recovered, separated from the catalyst and purified, the desired product comprising 5-[(1,4,5,6,7,7-hexachloro-5-norbornen-2-yl)acetyl]isophthalic acid being separated and recovered.

Example IV

An adduct comprising 1,4,5,6,7,7-hexachloro-5-norbornen-2-ylacetyl chloride is prepared according to the method set forth in Example I above by condensing equimolar amounts of hexachlorocyclopentadiene and vinylacetyl chloride. Following recovery of the adduct, equimolar portions of the adduct and trimesic acid are condensed in a manner similar to that set forth in Example I above utilizing aluminum chloride as catalyst. The desired product comprising 2-[(1,4,5,6,7,7-hexachloro-5-norbornen-2-yl)acetyl]trimesic acid is separated and recovered after completion of the desired residence time.

Example V

In this example 54 grams (0.1 mole) of hexabromocyclopentadiene and 10 grams (0.1 mole) of vinylacetyl chloride dissolved in 50 cc. of xylene are heated under reflux for a combined residence time of about 7.5 hours. At the end of this time the reaction mixture is subjected to fractional distillation under reduced pressure and the desired adduct comprising 1,4,5,6,7,7-hexabromo-5-norbornen-2-ylacetyl chloride is separated and recovered.

Equimolar portions of the adduct prepared according to the above paragraph and trimellitic acid along with zinc chloride catalyst and xylene are refluxed for a period of about 4 hours. At the end of this time the reaction mixture is separated from the catalyst and after conventional purification steps the desired product comprising 5-[(1,4,5,6,7,7-hexabromo-5-norbornen-2-yl)acetyl] trimellitic acid is separated and recovered.

I claim as my invention:

1. A compound selected from the group consisting of polycarboxylic acids and corresponding anhydrides having the formula (acid form):

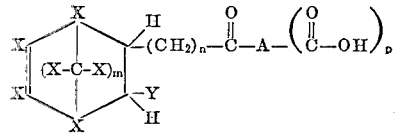

in which A is phenyl or naphthyl, $m$ is 1 or 2, $n$ is an integer of from 0 to 2, $p$ is an integer of from 2 to 4, X is chlorine, bromine or hydrogen, at least one X being chlorine or bromine, and Y is hydrogen, methyl or ethyl.

2. The compound of claim 1 wherein each X is chlorine.

3. The compound of claim 1 wherein each X is bromine.

4. 4-[(1,4,5,6,7,7-hexachloro-5-norbornen-2-yl) acetyl]phthalic acid.

5. 4-[(1,4,5,6,7,7-hexachloro-5-norbornen-2-yl) acetyl]phthalic anhydride.

6. 5-[(1,4,5,6,7,7-hexachloro-5-norbornen-2-yl) acetyl]isophthalic acid.

7. 2-[(1,4,5,6,7,7-hexachloro-5-norbornen-2-yl) acetyl]trimesic acid.

8. 5-[(1,4,5,6,7,7-hexabromo-5-norbornen-2-yl) acetyl]trimellitic acid.

9. A process for the preparation of a compound selected from the group consisting of halo-substituted bicycloalkenyl lower alkanoyl phenyl or naphthyl polycarboxylic acids and anhydrides thereof which comprises reacting a halo-substituted conjugated cycloalkadiene containing 5 or 6 carbon atoms in the ring, and in which the halogen(s) is chlorine or bromine, with a lower alkanoyl chloride or bromide characterized by the presence of at least one hydrogen atom on each of the doubly-bonded carbon atoms at a temperature of from about 100° to about 250° C., thereafter condensing the resultant halo-substituted bicycloalkenyl lower alkanoyl halide with a compound selected from the group consisting of phenyl or naphthyl polycarboxylic acids containing up to 4 carboxy groups and anhydrides thereof in the presence of a Friedel-Crafts metal halide catalyst at a temperature of from about 50° to about 200° C. and recovering the resultant product.

10. A process for the preparation of a compound selected from the group consisting of chloro-substituted bicycloalkenyl lower alkanoyl phenyl or naphthyl polycarboxylic acids and anhydrides thereof which comprises reacting a chloro-substituted conjugated cycloalkadiene containing 5 or 6 carbon atoms in the ring with a lower alkanoyl chloride characterized by the presence of at least one hydrogen atom on each of the doubly-bonded carbon atoms at a temperature of from about 100° to about 250° C., thereafter condensing the resultant chloro-substituted bicycloalkenyl lower alkanoyl chloride with a compound selected from the group consisting of phenyl or naphthyl polycarboxylic acids containing up to 4 carboxy groups and anhydrides thereof in the presence of a Friedel-Crafts metal chloride catalyst at a temperature of from about 50° to about 200° C., and recovering the resultant product.

11. A process for the preparation of a compound selected from the group consisting of bromo-substituted bicycloalkenyl lower alkanoyl phenyl or naphthyl polycarboxylic acids and anhydrides thereof which comprises reacting a bromo-substituted conjugated cycloalkadiene containing 5 or 6 carbon atoms in the ring with a lower alkanoyl bromide characterized by the presence of at least one hydrogen atom on each of the doubly-bonded carbon atoms at a temperature in the range of from about 100° to about 250° C., thereafter condensing the resultant bromo-substituted bicycloalkenyl lower alkanoyl bromide with a compound selected from the group consisting of phenyl or naphthyl polycarboxylic acids containing up to 4 carboxy groups and anhydrides thereof in the presence of a Friedel-Crafts metal bromide catalyst at a temperature of from about 50° to about 200° C., and recovering the resultant product.

12. A process which comprises reacting hexachlorocyclopentadiene with vinylacetyl chloride at a temperature in the range of from about 150° to about 250° C., thereafter condensing the resultant 1,4,5,6,7,7-hexachloro-5-norbornen-2-ylacetyl chloride with phthalic acid in the presence of aluminum chloride at a temperature in the range of from about 50° to about 200° C., and recovering the resultant 4-[(1,4,5,6,7,7-hexachloro-5-norbornen-2-yl)acetyl]phthalic acid.

13. A process which comprises reacting hexachlorocyclopentadiene with vinylacetyl chloride at a temperature in the range of from about 150° to about 250° C., thereafter condensing the resultant 1,4,5,6,7,7-hexachloro-5-norbornen-2-ylacetyl chloride with phthalic anhydride in the presence of aluminum chloride at a temperature in the range of from about 50° to about 200° C., and recovering the resultant 4-[(1,4,5,6,7,7-hexachloro-5-norbornen-2-yl)acetyl]phthalic anhydride.

14. A process which comprises reacting hexachlorocyclopentadiene with vinylacetyl chloride at a temperature in the range of from about 150° to about 250° C., thereafter condensing the resultant 1,4,5,6,7,7-hexachloro-5-norbornen-2-ylacetyl chloride with isophthalic acid in the presence of zinc chloride at a temperature in the range of from about 100° to about 200° C., and recovering the resultant 5-[(1,4,5,6,7,7-hexachloro-5-norbornen-2-yl)acetyl]isophthalic acid.

15. A process which comprises reacting hexachlorocyclopentadiene with vinylacetyl chloride at a temperature in the range of from about 150° to about 250° C., thereafter condensing the resultant 1,4,5,6,7,7-hexachloro-5-norbnen-2-ylacetyl chloride with trimesic acid in the presence of aluminum chloride at a temperature in the range of from about 100° to about 200° C., and recovering the resultant 2-[(1,4,5,6,7,7-hexachloro-5-norbornen-2-yl)acetyl]trimesic acid.

16. A process which comprises reacting hexabromocyclopentadiene with vinylacetyl chloride at a temperature in the range of from about 150° to about 250° C., thereafter condensing the resultant 1,4,5,6,7,7-hexabromo-5-norbornen-2-ylacetyl chloride with trimellitic acid in the presence of aluminum chloride at a temperature in the range of from about 50° to about 200° C., and recovering the resultant 5-[(1,4,5,6,7,7-hexabromo-5-norbornen-2-yl)acetyl]trimellitic acid.

References Cited

UNITED STATES PATENTS

Olah, G.: Friedel-Crafts and Related Reactions, vol. III, part I, New York, John Wiley & Sons, 1964, pp. 60–61, chapter 31, by P. H. Gore.

NICHOLAS S. RIZZO, *Primary Examiner.*

B. I. DENTZ, *Assistant Examiner.*